(12) United States Patent
Shinonaga

(10) Patent No.: US 7,561,100 B2
(45) Date of Patent: Jul. 14, 2009

(54) CORRELATION PROCESSOR FOR RECEIVER

(75) Inventor: Mitsuyoshi Shinonaga, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 155 days.

(21) Appl. No.: 11/476,864

(22) Filed: Jun. 29, 2006

(65) Prior Publication Data

US 2007/0200751 A1  Aug. 30, 2007

(30) Foreign Application Priority Data

Jun. 30, 2005 (JP) ............................. 2005-192912
Oct. 17, 2005 (JP) ............................. 2005-302331

(51) Int. Cl.
   G01S 7/285 (2006.01)
   G01S 7/32 (2006.01)
(52) U.S. Cl. .................. 342/189; 342/89; 342/196; 342/204
(58) Field of Classification Search ............. 342/189, 342/195–196, 59, 175, 89–103, 134–144, 342/201–204
   See application file for complete search history.

(56) References Cited

U.S. PATENT DOCUMENTS

| 6,989,782 B2 * | 1/2006 | Walker et al. ............ 342/134 |
| 7,151,484 B2 * | 12/2006 | Shinonaga et al. ......... 342/204 |
| 2005/0068226 A1 | 3/2005 | Shinonaga et al. | |

FOREIGN PATENT DOCUMENTS

JP     4-357485     12/1992

OTHER PUBLICATIONS

Mitsuyoshi Shinonaga, et al., "New Pulse Compression Filter to Realize Minimum S/N Loss with Zero Range Side Lobe", Electronics and Communications in Japan, Part 1, vol. 88, No. 4, 2005, pp. 1-9.
Mitsuyoshi Shinonaga, et al., "Performance Evaluation of Minimum S/N Loss Pulse Compression Filter with Zero Range Sidelobe Applied to Phase-Coded Waveforms", Electronics and Communications in Japan, Part 1, vol. 89, No. 3, 2006, pp. 10-20.
Mitsuyoshi Shinonaga, et al., "Performance Evaluation of Minimum S/N Loss Pulse Compression Filter with Zero Range Sidelobe", Electronics and Communications in Japan, Part 1, vol. 89, No. 1, 2006, pp. 45-53.
U.S. Appl. No. 11/476,864, filed Jun. 29, 2006, Shinonaga.
U.S. Appl. No. 11/751,979, filed May 22, 2007, Shinonaga.

* cited by examiner

*Primary Examiner*—Thomas H Tarcza
*Assistant Examiner*—Cassi Galt
(74) *Attorney, Agent, or Firm*—Oblon, Spivak, McClelland, Maier & Neustadt, P.C.

(57) ABSTRACT

A correlation processor for a receiver is capable of carrying out a correlation process with highly suppressed side lobes, improved resolution, and minimized S/N loss. The correlation processor is provided for a receiver that receives a signal having a specific time width and shape, for carrying out a correlation process on the received signal. The correlation processor has a filter coefficient unit to calculate a coefficient vector that zeroes sample values of all sample points except a peak center sample point of a main lobe of a correlation-processed waveform of the received signal and sample points on each side of the peak center and minimizes S/N loss of the sample value of the peak center sample point of the main lobe and a filter to carry out a correlation process on the received signal according to the coefficient vector calculated by the filter coefficient unit.

3 Claims, 4 Drawing Sheets

CORRELATION PROCESSOR FOR RECEIVER

BACKGROUND OF THE INVENTION

1. Field of the Invention

The present invention relates to a correlation processor for a receiver such as a radar, and particularly, to a technique of suppressing side lobes and lowering S/N loss.

2. Description of the Related Art

For example, Japanese Unexamined Patent Application Publication No. 4-357485 discloses a radar signal processor used for a radar and employing a pulse compression method. This radar signal processor transmits a chirp signal (linear FM signal) toward a target that is relatively moving, receives a reflected signal from the moving target, extracts a Doppler shift component which is caused by the moving target, from the received signal, and detects the moving target according to the extracted Doppler shift component.

After receiving an in-pulse modulated signal that is a chirp signal formed by modulating a long pulse, the pulse compression method obtains a short-pulse signal through a pulse compression filter appropriate for the in-pulse modulated signal. The pulse compression method is used in many radars because it is advantageous in extending a detection range by increasing in-pulse transmission energy, increasing a range resolution, and suppressing interfering and jamming signals.

Generally, the performance of a conventional radar (chirp radar) is evaluated with a waveform (output waveform) after the pulse compression process, more precisely, the pulse width of a main lobe (main lobe width), the levels of side lobes (side lobe levels), and the S/N loss of a peak value of the main lobe.

SUMMARY OF THE INVENTION

In connection with the pulse compression process, Japanese Patent Application No. 2004-289072 discloses a pulse compression processor. This pulse compression processor receives a chirp signal that is an in-pulse frequency modulated transmission signal and carries out correlation i.e. pulse compression processes on the received signal. The pulse compression processor employs an optimum filter to suppress side lobes and minimize S/N loss. This pulse compression processor can function the optimum filter only for a chirp transmission signal or a phase-modulated transmission signal.

A series of reception signals occasionally involves a burst signal to be detected. Such burst signal occurs, for example, in a tracking radar when detecting a reflected signal from a target antenna facing the front, or when detecting a reflected signal from a helicopter rotor facing the front or the traveling direction, or when detecting a reflected signal with an antenna oriented toward a target.

In these cases, the related art detects the reflected signal with an improper filter such as an FFT which generates side lobes and worsen S/N loss.

To solve the problems, the present invention provides a correlation processor for a receiver, capable of carrying out a detection process with suppressed side lobes and minimized S/N loss.

In order to achieve this, a principal aspect of the present invention provides a correlation processor provided for a receiver that receives an amplitude/phase-modulated signal, for carrying out a correlation process on the received signal. The correlation processor has a filter coefficient unit to calculate a coefficient vector that zeroes sample values of all sample points except a peak center sample point of a main lobe of a correlation-processed waveform of the received signal and sample points on each side of the peak center and minimizes S/N loss of the sample value of the peak center sample point of the main lobe; and a filter to carry out a correlation process on the received signal according to the coefficient vector calculated by the filter coefficient unit.

BRIEF DESCRIPTION OF THE DRAWINGS

FIGS. 2A and 2B are views explaining examples of input and output signals of the correlation processor according to the first and second embodiments of the present invention, in which FIG. 2A shows a received signal and FIG. 2B shows a correlation-processed signal;

FIGS. 5A and 5B are block diagrams showing correlation processors according to the second embodiment of the present invention, in which FIG. 5A shows an example 1 and FIG. 5B shows an example 2.

DESCRIPTION OF THE PREFERRED EMBODIMENT

The correlation processors for receivers according to the embodiments of the present invention will be described in detail with reference to the drawings.

Figure 1:
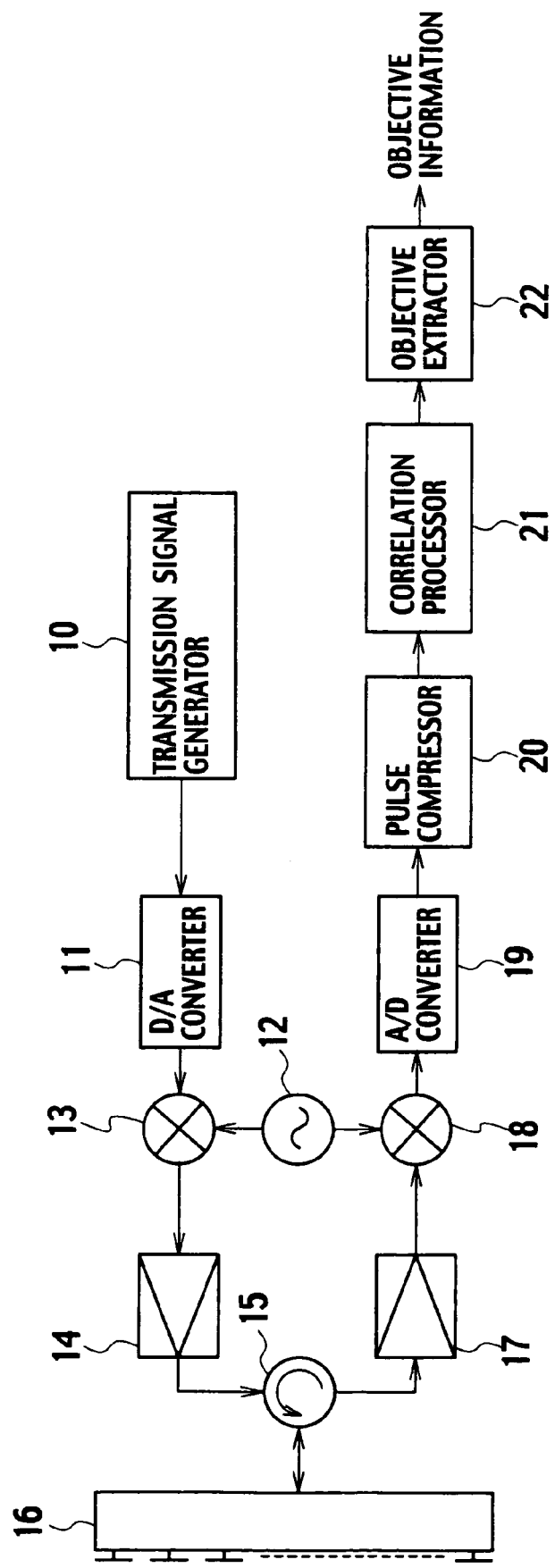
FIG. 1 is a block diagram generally showing a radar signal processor that employs a correlation processor for a receiver according to a first embodiment of the present invention.

A radar signal processor employing the correlation processor according to one of the first and second embodiments of the present invention will roughly be explained with reference to the block diagram of FIG. 1.

The radar signal processor consists of a transmission signal generator 10, a D/A converter 11, a local oscillator 12, a transmission mixer 13, a transmission signal amplifier 14, a circulator 15, an antenna 16, a received-signal amplifier 17, a reception mixer 18, an A/D converter 19, a pulse compressor 20, a correlation processor 21, and a target extractor 22.

The transmission signal generator 10 has a pulse repetition frequency (hereinafter referred to as PRF) to generate a transmission signal which is a pulse signal having specific intervals and a shape.

The D/A converter 11 converts the pulse signal from the transmission signal generator 10 into an analog signal, which is transferred to the transmission mixer 13.

The local oscillator 12 generates a local signal (synchronous signal) having a local frequency.

The transmission mixer 13 mixes the signal from the D/A converter 11 with the local signal from the local oscillator 12 into a high-frequency signal, which is transferred to the transmission signal amplifier 14.

The transmission signal amplifier 14 amplifies the high-frequency signal from the transmission mixer 13 to a prescribed level and transfers the same to the circulator 15. The circulator 15 switches between providing the antenna 16 with the high-frequency signal from the transmission signal amplifier 14 and providing the received-signal amplifier 17 with a received signal from the antenna 16.

The antenna 16 is, for example, an array antenna to transmit the high-frequency signal, which is transferred from the transmission signal amplifier 14 through the circulator 15, toward a target. Also, the antenna 16 receives a reflected wave from a target and transfers the received signal to the circulator 15.

The received-signal amplifier 17 low-noise-amplifies the received signal transferred from the antenna 16 through the circulator 15 and transfers the amplified signal to the reception mixer 18.

The reception mixer 18 mixes the received signal from the received-signal amplifier 17 with the local signal from the local oscillator 12 into an intermediate-frequency signal (IF signal), which is transferred to the A/D converter 19.

The A/D converter 19 converts the IF signal from the reception mixer 18 into an orthogonal digital signal (I/Q signal), which is transferred to the pulse compressor 20. The pulse compressor 20 compresses the signal and transfers the compressed signal to the correlation processor 21.

The correlation processor 21 carries out a correlation process on the pulse-compressed signal from the pulse compressor 20 to improve S/N of the signal. The target extractor 22 extracts an objective component from the signal provided by the correlation processor 21, to thereby extract a target.

First Embodiment

The details of the correlation processor (corresponding to the correlation processor 21 of FIG. 1) according to the first embodiment of the present invention will be explained.

Figure 3:
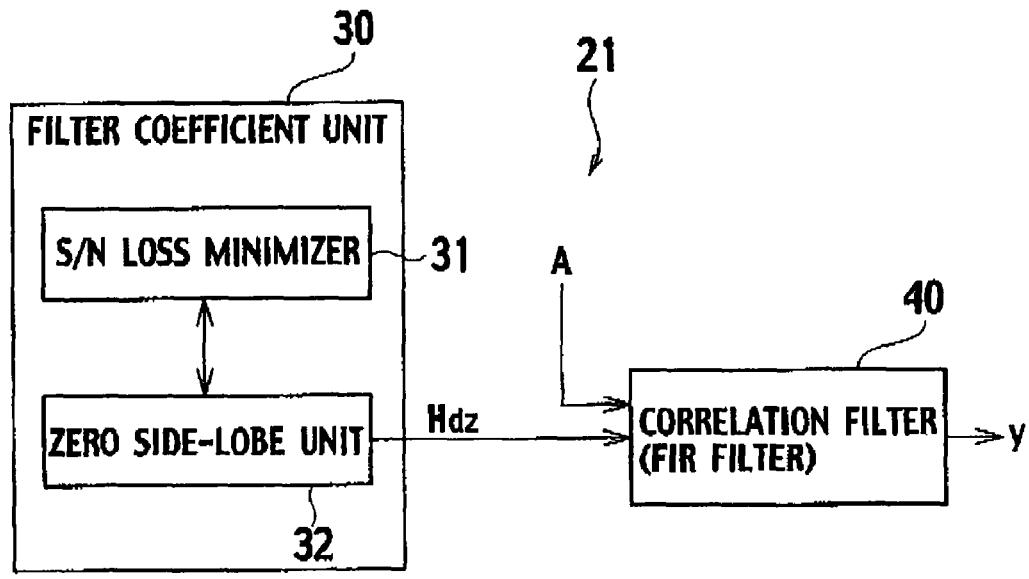
FIG. 3 is a block diagram showing a configuration of the correlation processor according to the first embodiment of the present invention.

FIG. 3 is a block diagram showing the details of the correlation processor 21. The correlation processor 21 has a filter coefficient unit 30 and a correlation filter 40 (corresponding to the filter of the present invention).

The filter coefficient unit 30 calculates a first coefficient vector $\vec{H}_{dz}$ given to the correlation filter 40. The filter coefficient unit 30 has an S/N loss minimizer 31 and a zero side-lobe unit 32.

The S/N loss minimizer 31 generates a second coefficient vector $\vec{H}_{zM}$ as coefficient data that theoretically minimizes S/N loss. The output of the S/N loss minimizer 31 is sent to the zero side-lobe unit 32.

The zero side-lobe unit 32 uses the second coefficient vector $\vec{H}_{zM}$ from the S/N loss minimizer 31, to generate the first coefficient vector $\vec{H}_{dz}$ as coefficient data that realizes zero side lobes (side-lobe-free state) by suppressing side lobes to zeros. The first coefficient vector is sent to the correlation filter 40.

Figure 4:
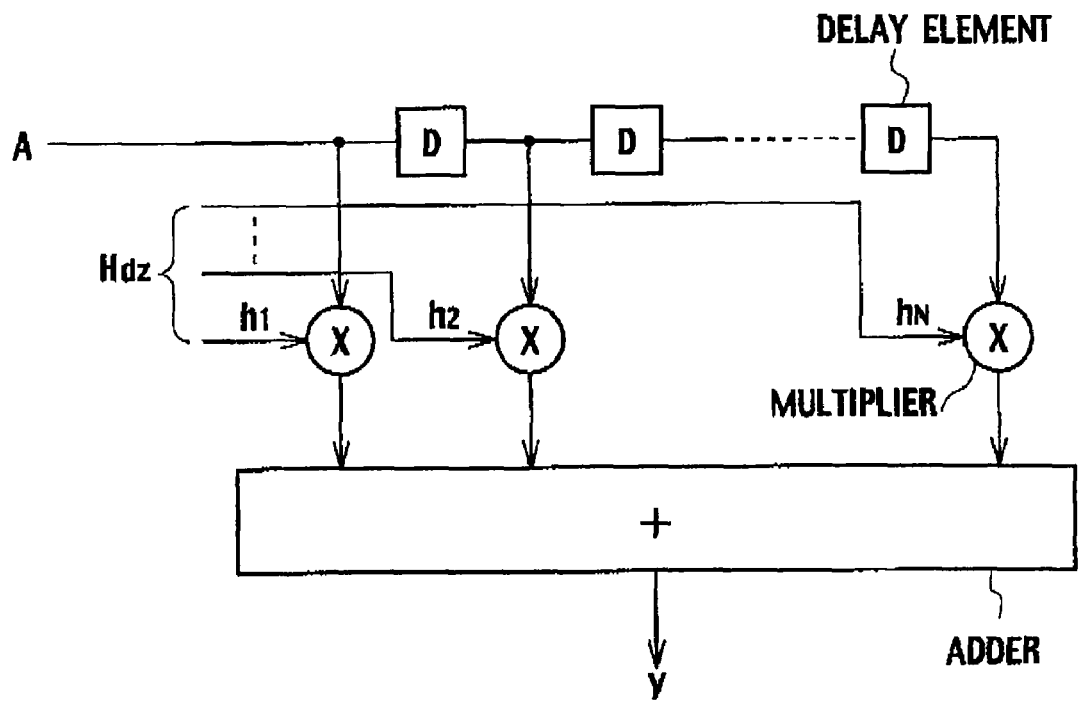
FIG. 4 is a view showing an FIR filter serving as a correlation filter in the correlation processor according to the first embodiment of the present invention.

The correlation filter 40 is, for example, an FIR (finite impulse response) filter shown in FIG. 4. The FIR filter has a known structure with delay elements (D) for one sweep, multipliers (X), and an adder (+). According to the first coefficient vector $\vec{H}_{dz}$ from the filter coefficient unit 30, the correlation filter 40 carries out a correlation operation on an I/Q signal (A($\vec{A}$)) and provides a signal y($\vec{y}$).

A method of generating the first coefficient vector $\vec{H}_{dz}$ in the filter coefficient unit 30 will be explained. First, a side-lobe-free condition for correlation reception will be explained.

<Principle of Correlation Filter Reception>

Figure 2A:
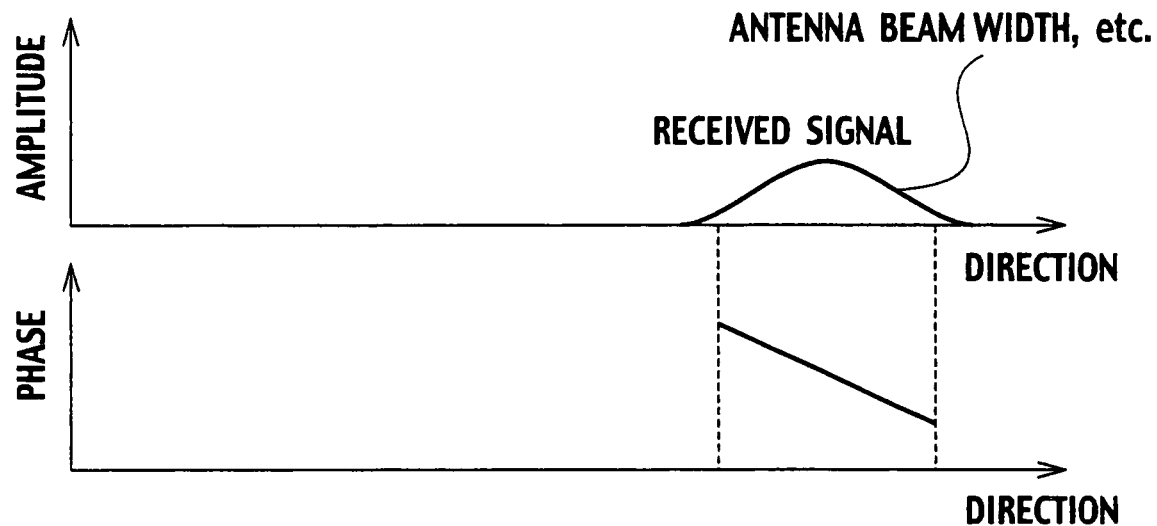
Figure 2B:
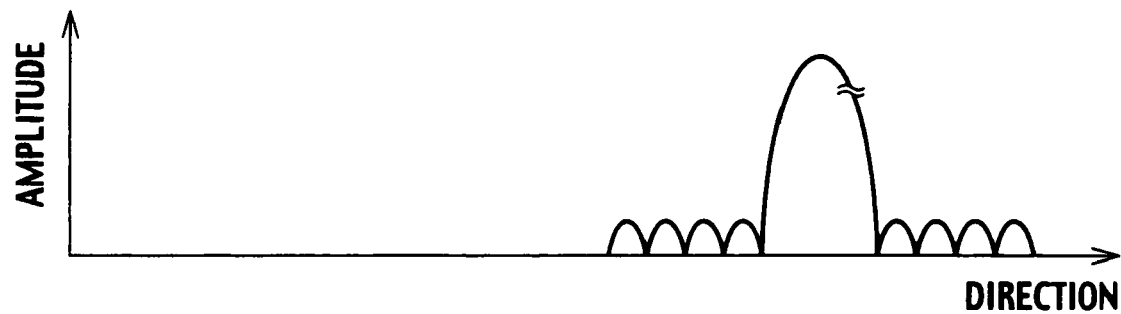

In the correlation processor 21 of the radar signal processor, an input signal (received signal) to the correlation filter 40 is an amplitude/phase-modulated signal as shown in FIG. 2A. The phase-modulated signal may be a signal modulated with a code string. The input signal may be an amplitude-modulated signal having a predetermined frequency. The input signal may be a phase-modulated signal having a predetermined amplitude. The input signal may be a phase-modulated signal having a predetermined amplitude. FIG. 2B is an image showing an output waveform.

A time series of the amplitude/phase-modulated input signal is expressed as a vector:

$$\vec{A} = (a_1, a_2, \ldots, a_N), \quad (1)$$

where vector components $a_1, \ldots, a_N$ are sampled I/Q data of the received signal in order of sampling and correspond to sample values of radar received pulses. Namely, the input signal is a series of sample values of a reflected pulse signal in the same range.

A filter coefficient vector $\vec{H}$ of the correlation filter 40 can be expressed as an FIR filter coefficient vector of N taps as follows:

$$\vec{H} = (h_1, h_2, \ldots, h_N) \quad (2)$$
$$= (w_1 C_1, w_2 C_2, \ldots, w_N C_N)$$
$$= \vec{C} W,$$

where a coefficient vector of a matched filter is expressed as follows:

$$\vec{C} = (C_1, C_2, \ldots, C_N) = (a_N^*, a_{N-1}^*, \ldots, a_1^*), \quad (3)$$

and a weighting matrix W (corresponding to a window function) is expressed as follows:

$$W = \begin{bmatrix} w_1 & & & O \\ & w_2 & & \\ & & \ddots & \\ O & & & w_N \end{bmatrix} = diag(W), \quad (4)$$

here, the symbol of asterisk "*" represents a complex conjugate and the symbol "diag" represents a diagonal matrix.

A time series of an output signal from the correlation filter 40 is expressed as the following output vector:

$$\vec{y} = (y_1, y_2, \ldots, y_{2N-1}) = \vec{H} X^T = \vec{C} W X^T, \quad (5)$$

where the symbol "T" represents a transposed matrix and the following is a state matrix having N times (2N−1) elements and representing an input signal to each delay stage (D) of the FIR filter, i.e., the correlation filter:

$$X = \begin{bmatrix} a_1 & & & & O \\ a_2 & a_1 & & & \\ \vdots & & \ddots & & \\ a_N & a_{N-1} & \cdots & a_1 & \\ & a_N & & & a_2 \\ & & \ddots & & \vdots \\ O & & & & a_N \end{bmatrix} \} 2N-1. \quad (6)$$

By substituting the expressions (2) to (4) and (6) into the expression (5), the following is obtained:

$$\vec{y} = \overbrace{(w_1 a_N^* a_1, w_1 a_N^* a_2 + w_2 a_{N-1}^* a_1, w_1 a_N^* a_3 + w_2 a_{N-1}^* a_2 + w_3 a_{N-2}^* a_3, \ldots, w_N a_1^* a_N)}^{2N-1}. \quad (5')$$

Elements of the output vector $\vec{y}$ are expected values of correlation among the elements $a_1, \ldots, a_N$ of the input vector $\vec{A}$, and therefore, the output vector $\vec{y}$ is called a correlation output.

<Formulation of Process in Frequency Space>

In recent years, a correlation process for reception is carried out more frequently in a frequency space with Fourier transform than in a real space with an FIR filter having a filter coefficient expressed with the expression (2). To improve processing efficiency, a correlation process is collectively achievable in a frequency space on a series of samples from a received signal whose length is longer than the series length N of the expression (1).

In consideration of these circumstances, the present invention processes input and output signals to and from the correlation filter 40 in a frequency space with the use of Fourier transform (and inverse Fourier transform) based on the following relationship between a real space vector (the expression 5) and a frequency space vector (the expression 7):

$$\overset{\text{vector in real space}}{\vec{y} = \vec{H} X^T} \quad (5)$$

$$\underset{\text{IFFT}}{\overset{\text{FFT}}{\rightleftarrows}} \overset{\text{vector in frequency space}}{Q\vec{y}_z^T = Q(\vec{H}_z X_z^T)^T = Q X_z \vec{H}_z^T} \quad (7)$$

where a fast Fourier transform (FFT) operation matrix is expressed by $$Q = \begin{bmatrix} q_{11} & \cdots & q_{1N_f} \\ \vdots & \ddots & \vdots \\ q_{N_f 1} & \cdots & q_{N_f N_f} \end{bmatrix}, \quad (8)$$

and each element thereof is expressed by $$q_{nk} = e^{-j\frac{2\pi}{N_f}(n-1)(k-1)}, \quad (9)$$

where $n, k = 1, \ldots, N_f$ and $N_f$ is the number of points of the fast Fourier transform.

Also, definitions are made as follows:

$$\vec{y}_z = \left(y_1, y_2, \ldots y_{2N-1}, \overbrace{0, \ldots, 0}^{N_f - (2N-1)}\right) \equiv \left(\vec{y}, \overbrace{0, \ldots, 0}^{N_f - (2N-1)}\right), \quad (10)$$

$$\vec{H}_z = \left(h_1, h_2, \ldots, h_N, \overbrace{0, \ldots, 0}^{N_f - N}\right) \equiv \left(\vec{H}, \overbrace{0, \ldots, 0}^{N_f - N}\right), \quad (11)$$

$$X_z = \begin{bmatrix} a_1 & & & \overbrace{O}^{N_f - N} & a_N & \cdots & \cdots & a_2 \\ a_2 & a_1 & & & & & \ddots & \vdots \\ \vdots & a_2 & \ddots & & & & & \vdots \\ a_{N-1} & \vdots & \cdots & a_1 & & O & & a_N \\ a_N & a_{N-1} & \cdots & a_2 & a_1 & & & \\ & a_N & & & & a_1 & & O \\ O & & \ddots & & \vdots & & \ddots & \\ & & O & & a_N & \cdots & a_2 & a_1 \end{bmatrix}, \quad (12)$$

$$\vec{A}_z = \left(a_1, a_2, \ldots, a_N, \overbrace{0, \ldots, 0}^{N_f - N}\right) \equiv \left(\vec{A}, \overbrace{0, \ldots, 0}^{N_f - N}\right), \quad (13)$$

and $$\vec{C}_z = \left(c_1, c_2, \ldots, c_N, \overbrace{0, \ldots, 0}^{N_f - N}\right) \equiv \left(\vec{C}, \overbrace{0, \ldots, 0}^{N_f - N}\right). \quad (14)$$

As mentioned above, the number of points $N_f$ of FFT must be larger than the number of samples ($2N-1$) of an output time series from the correlation filter 40. Accordingly, each quantity (vector or matrix) of the expressions (7) to (14) is provided with zero components to meet the number of points $N_f$ of FFT.

By substituting the expressions (8) to (14) into the expression (7), the following is obtained:

$$Q\vec{y}_z^T = QX_z \vec{H}_z^T = QX_z E \vec{H}_z^T = QX_z (\hat{Q}Q) \vec{H}_z^T (QX_z \hat{Q})(Q\vec{H}_z^T) \quad (15)$$

$$= \begin{bmatrix} (Q\vec{A}_z^T)_1 & \cdots & O \\ \vdots & \ddots & \vdots \\ O & \cdots & (Q\vec{A}_z^T)_{N_f} \end{bmatrix} (Q\vec{H}_z^T)$$

$$= diag(Q\vec{A}_z^T)(Q\vec{H}_z^T)$$

where an inverse fast Fourier transform (IFFT) operation matrix is expressed by $$\hat{Q} \equiv \frac{Q^*}{N_f}. \quad (16)$$

This satisfies the following normalization condition:

$$Q\hat{Q} = \hat{Q}Q = E \quad (17)$$

here E is a unit matrix.

Based on this condition, a side-lobe-free output vector (expected output) according to the present invention is given as follows:

$$\vec{y}_{mz} = \begin{pmatrix} 0, \ldots 0, y_{N-Nx}, \ldots, y_N, \ldots, \\ y_{N+Nx}, 0, \ldots, 0, \overline{0, \ldots, 0}^{N_f-(2N-1)} \end{pmatrix} \quad (18)$$

$$= \left( \vec{y}_m, \overline{0, \ldots, 0}^{N_f-(2N-1)} \right)$$

$$\equiv \vec{H}_{dz} X_z^T,$$

and $$\vec{y}_m \equiv (0, \ldots 0, y_{N-Nx}, \ldots, y_N, \ldots, y_{N+Nx}, 0, \ldots, 0). \quad (19)$$

Namely, among a time series of outputs given by the expression (5) with a normal coefficient vector, only the outputs (sample values) in the vicinities of a peak output (in a region up to $N_x$ around a sample point N) are accepted and the other sample values are replaced with zeroes. The present invention uses the expression (19) as an output vector satisfying the side-lobe-free condition. Then, $\vec{H}_{dz}$ of the expression (18) is the required coefficient vector.

Next, the expression (15) is used to calculate the coefficient vector $\vec{H}_{dz}$ that satisfies the condition of the expression (18).

Each side of the expression (18) is multiplied by the FFT operation matrix Q from the left side thereof and the expression (15) is used as follows:

$$Q\vec{y}_{mz}^T = QX_z\vec{H}_{dz}^T \quad (20)$$

$$= (QX_z\hat{Q})(Q\vec{H}_{dz}^T)$$

$$= diag(Q\vec{A}_z^T)(Q\vec{H}_{dz}^T).$$

Each side of this expression is multiplied by $[diag(Q\vec{A}_z^T)]^{-1}$ from the left side thereof as follows:

$$Q\vec{H}_{dz}^T = [diag(Q\vec{A}_z^T)]^{-1} Q\vec{y}_{mz}^T. \quad (21)$$

Each side of this expression is multiplied by the IFFT operation matrix $\hat{Q}$ as follows:

$$\vec{H}_{dz}^T = \hat{Q}(Q\vec{H}_{dz}^T) \quad (22)$$

$$= \hat{Q}[diag(Q\vec{A}_z^T)]^{-1} Q\vec{y}_{mz}^T$$

$$= \hat{Q}BQ\vec{y}_{mz}^T,$$

where $$B = \begin{bmatrix} \frac{1}{(Q\vec{A}_z^T)_1} & \cdots & O \\ \vdots & \ddots & \vdots \\ O & \cdots & \frac{1}{(Q\vec{A}_z^T)_{N_f}} \end{bmatrix}. \quad (23)$$

In consequence, it is understood that the filter coefficient vector $\vec{H}_{dz}$ that satisfies the side-lobe-free condition is determinable if defining the expected output value vector $\vec{y}_{mz}$ of the expression (22) for the side-lobe-free condition. The expected output value vector $\vec{y}_{mz}$ can be obtained from the coefficient vector $\vec{H}_z$. Accordingly, by determining the coefficient vector $\vec{H}_z$, the side-lobe-free coefficient vector $\vec{H}_{dz}$ can be obtained from the expression (22).

In this way, the zero side-lobe unit 32 provides the correlation filter 40 with the coefficient vector $\vec{H}_{dz}$ given by the expression (22).

<Finding S/N Loss Under Side-Lobe-Free Condition>

In the above, the method of calculating the coefficient vector that satisfies the side-lobe-free condition has been described. Generally, such a method is thought to cause a drastic S/N deterioration if noise is present. Accordingly, an expression of calculating a correlation coefficient vector that simultaneously satisfies two conditions of minimizing S/N loss and realizing side-lobe-free state will be found. Average power of the input signal $\vec{A}$ of the expression (1) to the correlation filter is given by $$S_{in} = \frac{\vec{A} \cdot (\vec{A}^T)^*}{N}, \quad (24)$$

where N is the number of samples of an input signal in the expression (1).

Assuming that noise applied to each sample point (i.e., each vector component of the expression (1)) of an input signal is uncorrelated, average input noise power can be written as:

$$N_{in} = \sigma^2. \quad (25)$$

At this time, a peak power value of a correlated output signal from the filter is given by $$S_{out} = (\vec{C}_z^* \cdot \vec{H}_{dz}^T)\left\{(\vec{C}_z^* \cdot \vec{H}_{dz}^T)^T\right\}^* \quad (26)$$

$$= (\vec{C}_z^* \cdot \vec{H}_{dz}^T)(\vec{H}_{dz}^* \cdot \vec{C}_z^T),$$

and its average noise output is given by $$N_{out} = \{\vec{H}_{dz} \cdot (\vec{H}_{dz}^T)^*\}\sigma^2. \quad (27)$$

A correlated output signal from a matched filter has a peak power value and an average noise output as expressed by:

$$S_0 = (\vec{C}_z^* \cdot \vec{C}_z^T)\left\{(\vec{C}_z^* \cdot \vec{C}_z^T)^T\right\}^* \quad (28)$$

$$= (\vec{C}_z^* \cdot \vec{C}_z^T)(\vec{C}_z^* \cdot \vec{C}_z^T),$$

and $$N_0 = \{\vec{C}_z \cdot (\vec{C}_z^T)^*\}\sigma^2. \quad (29)$$

Generally, an index L indicative of S/N loss is defined as follows:

$$L \equiv \frac{\left(\frac{S_{out}/N_{out}}{S_{in}/N_{in}}\right)}{\left(\frac{S_0/N_0}{S_{in}/N_{in}}\right)} \qquad (30)$$

$$= \frac{S_{out}}{N_{out}} \times \frac{N_0}{S_0}.$$

Into this expression, the expressions (24) to (29) are substituted to obtain $$L = \frac{S_{out}}{N_{out}} \cdot \frac{N_0}{S_0} \qquad (31)$$

$$= \frac{(\vec{C}_z^* \cdot \vec{H}_{dz}^T)(\vec{H}_{dz}^* \cdot \vec{C}_z^T)}{\{\vec{H}_{dz} \cdot (\vec{H}_{dz}^T)^*\}\sigma^2} \times \frac{\{\vec{C}_z \cdot (\vec{C}_z^T)^*\}\sigma^2}{(\vec{C}_z^* \cdot \vec{C}_z^T)(\vec{C}_z^* \cdot \vec{C}_z^T)}$$

$$= \frac{(\vec{C}_z^* \cdot \vec{H}_{dz}^T)(\vec{H}_{dz}^* \cdot \vec{C}_z^T)}{\vec{H}_{dz} \cdot (\vec{H}_{dz}^T)^*} \times \frac{1}{\vec{C}_z \cdot (\vec{C}_z^T)^*} \cdot (\because \vec{C}_z^* \cdot \vec{C}_z^T = \vec{C}_z \cdot (\vec{C}_z^T)^*).$$

The index L increases and approaches 1 as S/N loss decreases.

This, however, is unable to analytically find the required condition. Accordingly, an identical relational expression is used as follows:

$$\vec{H}_{dz}^T = \hat{Q} B Q \vec{y}_{mz}^T \qquad (32)$$
$$= \hat{Q} B Q X_{mz} \vec{H}_z^T \ (\because Ex.(18))$$
$$= u \vec{H}_z^T$$
$$\leftrightarrow \vec{H}_{dz} = \vec{H}_z u^T$$

where, $$u \equiv \hat{Q} B Q X_{mz} = \frac{Q^* B Q X_{mz}}{N_f}, \ (\because Ex.(16)) \qquad (33)$$

$$X_{mz} = \begin{bmatrix} \overbrace{X_m}^{N_f - N} & O \\ O & O \end{bmatrix} \Big\} N_f - (2N-1), \qquad (34)$$

and a newly defined input state matrix is given by $$X_m = \begin{bmatrix} \overbrace{O \qquad \qquad O}^{N} \\ a_{N-Nx} \cdots \quad \cdots \ a_1 \\ \vdots \qquad \qquad \ddots \\ a_N \ \cdots \ \cdots \ \cdots \ a_1 \\ \ddots \qquad \qquad \vdots \\ a_N \ \cdots \ \cdots \ a_{Nx+1} \\ O \qquad \qquad O \end{bmatrix} \Big\} 2N-1. \qquad (35)$$

With the use of the expression (32), the expression (31) can be rewritten as a quadratic form of $\vec{H}_z$ as follows:

$$L = \frac{(\vec{C}_z^* \cdot \vec{H}_{dz}^T)(\vec{H}_{dz}^* \cdot \vec{C}_z^T)}{\vec{H}_{dz} \cdot (\vec{H}_{dz}^T)^*} \times \frac{1}{\vec{C}_z \cdot (\vec{C}_z^T)^*} \qquad (36)$$

$$= \frac{\{\vec{C}_z^* \cdot (u\vec{H}_z^T)\}[\{(u\vec{H}_z^T)\}^* \cdot \vec{C}_z^T]}{(\vec{H}_z u^T) \cdot (u\vec{H}_z^T)^*} \times \frac{1}{\vec{C}_z \cdot (\vec{C}_z^T)^*}$$

$$= \frac{\{(\vec{C}_z^* u) \cdot \vec{H}_z^T\}[\{(\vec{C}_z^* u)\vec{H}_z^T\}^T]^*}{\vec{H}_z u^T u^* (\vec{H}_z^T)^*} \times \frac{1}{\vec{C}_z \cdot (\vec{C}_z^T)^*}.$$

Substituting an expression:

$$u^T u^* = (\hat{Q} B Q X_{mz})^T (\hat{Q} B Q X_{mz})^* \qquad (37)$$

$$= X_{mz}^T Q^T B^T (\hat{Q}^T \hat{Q}^*) B^* Q^* X_{mz}^*$$

$$= \frac{X_{mz}^T Q^T B^T B^* Q^* X_{mz}^*}{N_f}, \left(\because \hat{Q}^T \hat{Q}^* = \frac{(Q^*)}{N_f} \cdot \frac{Q}{N_f} = \frac{E}{N_f}\right),$$

into the expression (36) leads to the following expression:

$$L = \frac{\{(\vec{C}_z^* u) \cdot \vec{H}_z^T\}[\{(\vec{C}_z^* u) \cdot \vec{H}_z^T\}^T]^*}{\vec{H}_z \{X_{mz}^T (Q^T B^T B^* Q^*) X_{mz}^*\} (\vec{H}_z^T)^*} \times \frac{N_f}{\vec{C}_z \cdot (\vec{C}_z^T)^*}. \qquad (38)$$

And substituting definitional expressions:

$$\vec{v} \equiv \vec{C}_z^* u, \qquad (39)$$

$$z \equiv X_{mz}^T (Q^T B^T B^* Q^*) X_{mz}^*, \qquad (40)$$

and $$\beta \equiv \frac{N_f}{\vec{C}_z \cdot (\vec{C}_z^T)^*}, \qquad (41)$$

into the above expression (38) leads to the following expression:

$$L = \frac{(\vec{v} \cdot \vec{H}_z^T)\{(\vec{v} \cdot \vec{H}_z^T)^T\}^*}{\vec{H}_z z (\vec{H}_z^T)^*} \beta. \qquad (42)$$

Further, using the following definitions:

$$\vec{F} \equiv \vec{v}(z^{-\frac{1}{2}})^*, \qquad (43)$$

$$\vec{G} \equiv \vec{H}_z^* (z^{\frac{1}{2}})^* \leftrightarrow (\vec{G}^T)^* = (z^{\frac{1}{2}})^* \vec{H}_z^T, \qquad (44)$$

the following expression (42) can be obtained:

$$L = \frac{\{\vec{F} \cdot (\vec{G}^{T^*})\}[\{\vec{F} \cdot (\vec{G}^{T^*})\}^T]^*}{\vec{G}^* \cdot \vec{G}^T} \beta. \qquad (45)$$

With the following Schwartz inequality:

$$\{\vec{F} \cdot (\vec{G}^T)^*\}[\{\vec{F} \cdot (\vec{G}^T)^*\}^T]^* \leq \{\vec{F} \cdot (\vec{F}^T)^*\}\{\vec{G} \cdot (\vec{G}^T)^*\}, \qquad (46)$$

the S/N loss index L of the expression (45) can be evaluated as follows:

$$\begin{aligned} L &= \frac{\{\vec{F} \cdot (\vec{G}^{T^*})\}[\{\vec{F} \cdot (\vec{G}^{T^*})\}^T]^*}{\vec{G}^* \cdot \vec{G}^T} \beta \\ &\leq \frac{\{\vec{F} \cdot (\vec{F}^{T^*})\}\{\vec{G} \cdot (\vec{G}^{T^*})\}}{\vec{G}^* \cdot \vec{G}^T} \beta \\ &= \{\vec{F} \cdot (\vec{F}^{T})^*\}\beta \\ &= [\vec{v}(z^{-\frac{1}{2}})^* \cdot \{(z^{-\frac{1}{2}})^*(\vec{v}^T)^*\}]\beta (\because \text{Ex. (43)}, z^* = z^T) \\ &= \{\vec{v}(z^{-1})^*(\vec{v}^T)^*\}\beta. \end{aligned} \qquad (47)$$

Accordingly, the condition of minimizing S/N loss is met when the equal mark of the inequality (47) holds to satisfy the following relationship:

$$\alpha \vec{F} = \vec{G}, \qquad (48)$$

where $\alpha$ is an optional complex constant. The following expression is obtained by substituting the expressions (43) and (44) into the expression (48):

$$\alpha \vec{v}(z^{-\frac{1}{2}})^* = \vec{H}_z^*(z^{\frac{1}{2}})^*. \qquad (49)$$

Each side of this expression is multiplied by a matrix $(z^{1/2})^*$ from the right thereof, and the expression (39) is applied to obtain:

$$\alpha \vec{v} = \vec{H}_z^* z^* = \alpha \vec{C}_z^* u. (\because \text{Ex. (39)}) \qquad (50)$$

Each side of this expression is multiplied by a matrix $(z^{-1})^*$ to obtain:

$$\vec{H}_z^* = \alpha (\vec{C}_z^* u)(z^{-1})^*. \qquad (51)$$

Finally, the condition of minimizing S/N loss is obtained as follows:

$$\vec{H}_z = \alpha^* \vec{C}_z u^* z^{-1} \equiv \vec{H}_{zM}. \qquad (52)$$

Accordingly, it is understood that, to minimize S/N loss with a side-lobe-free coefficient vector, the coefficient vector $\vec{H}_z$ or $\vec{H}_{zM}$ of the expression (52) must be converted into the side-lobe-free coefficient vector $\vec{H}_{dz}$ of the expression (32). Then, the coefficient vector that can minimize S/N loss and suppress side lobes is obtained.

In this way, the S/N loss minimizer 31 calculates the coefficient $\vec{H}_z$ or $\vec{H}_{zM}$ of the expression (52) and transfers the same to the zero side-lobe unit 32. The zero side-lobe unit 32 substitutes the coefficient vector $\vec{H}_z$ or $\vec{H}_{zM}$ from the S/N loss minimizer for the side-lobe-free coefficient vector $\vec{H}_{dz}$ of the expression (32), calculates the side-lobe-free coefficient vector, and transfers the same to the correlation filter 40.

Second Embodiment

The above-mentioned first embodiment handles a coefficient vector for an FIR filter (correlation filter 40) as a vector (i.e., $\vec{H}_{dz}$) in a real space. The correlation processor for a receiver according to the second embodiment of the present invention is characterized by carrying out a correlation filter process in a frequency space with Fourier transform.

Example 1

Figure 5A:
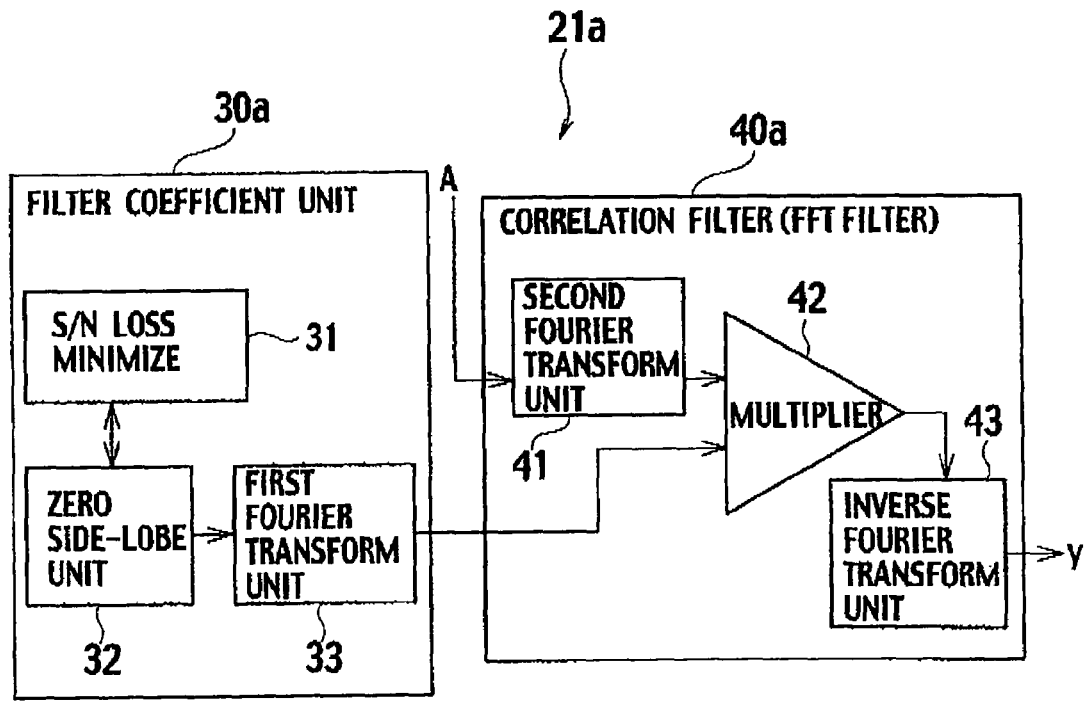

FIG. 5A shows a block diagram showing an example of the correlation processor according to the second embodiment of the present invention. The correlation processor has a filter coefficient unit 30a and a correlation filter 40a. The same components as those of the correlation processor of the first embodiment are represented with the same reference numerals.

The filter coefficient unit 30a has an S/N loss minimizer 31, a zero side-lobe unit 32, and a first Fourier transform unit 33.

The S/N loss minimizer 31 generates coefficient data (coefficient vector) $\vec{H}_z$ ($\vec{H}_{zM}$) to theoretically minimize S/N loss. The output of the S/N loss minimizer 31 is transferred to the zero side-lobe unit 32.

Based on the coefficient data (coefficient vector) $\vec{H}_z$ ($\vec{H}_{zM}$) from the S/N loss minimizer 31, the zero side-lobe unit 32 generates coefficient data $\vec{H}_{dz}$ to realize zero side lobes (side-lobe-free state), i.e., side lobes being suppressed to zeroes. The coefficient vectors $\vec{H}_z$ ($\vec{H}_{zM}$) and $\vec{H}_{dz}$ can be derived in the same manner as of the first embodiment. The coefficient vector $\vec{H}_{dz}$ from the zero side-lobe unit 32 is transferred to the first Fourier transform unit 33.

The first Fourier transform unit carries out the fast Fourier transform Q of the expression (8) on the coefficient vector $\vec{H}_{dz}$ transferred from the zero side-lobe unit 32, to provide the correlation filter 40a with a coefficient vector $Q\vec{H}_{dz}$ in a frequency space.

The correlation filter 40a consists of a second Fourier transform unit 41, a multiplier 42, and an inverse Fourier transform unit 43.

The second Fourier transform unit 41 carries out the fast Fourier transform Q of the expression (8) on an I/Q signal $\vec{A}$ transferred from a pulse compressor 20 to provide the multiplier 42 with an input signal $Q\vec{A}_z$ in a frequency space.

According to the fast-Fourier-transformed coefficient vector $Q\vec{H}_{dz}$ in a frequency space transferred from the filter coefficient unit 30a, the multiplier 42 compresses each pulse of the fast-Fourier-transformed I/Q signal $Q\vec{A}_z$ in a frequency space transferred from the second Fourier transform unit, to provide the inverse Fourier transform unit 43 with an output vector $Q\vec{y}_{mz}$ in a frequency space.

The inverse Fourier transform unit 43 carries out the inverse Fourier transform $\overset{\rightarrow}{Q}$ of the expression (16) on the data ($Q\vec{y}_{mz}$) in a frequency region transferred from the multiplier 42 and outputs data $\vec{y}_{mz}$ in a time region. As results, the correlation filter 40a outputs a signal $\vec{y}$ or $\vec{y}_{mz}$ equivalent to that of the first embodiment.

Example 2

Figure 5B:
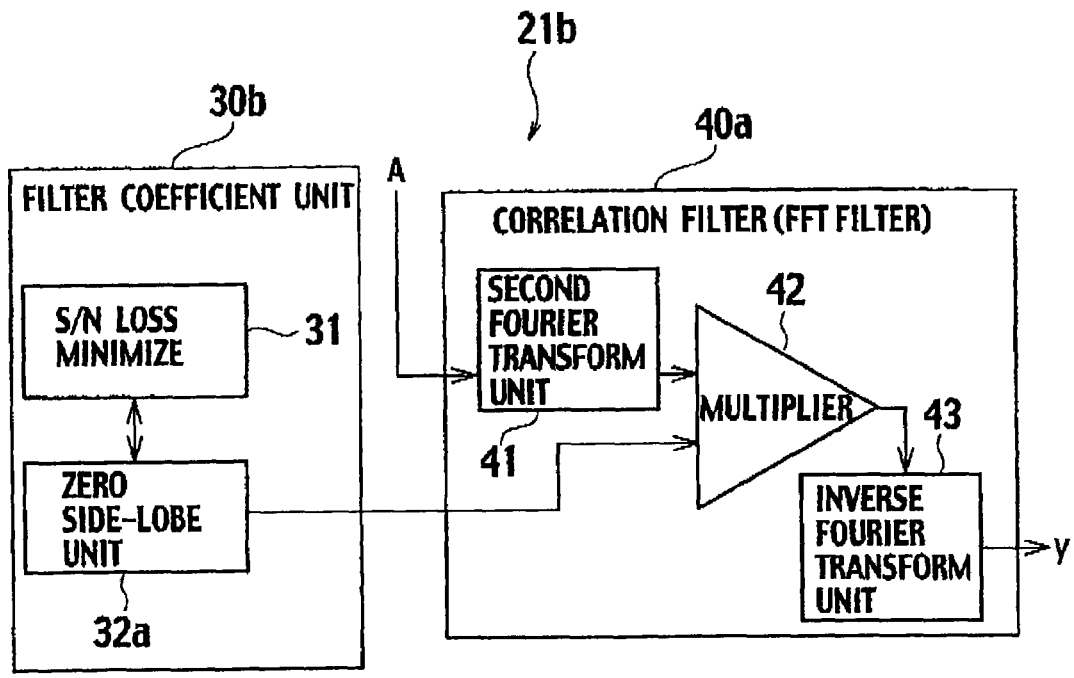

FIG. 5B shows another example according to the second embodiment. The first Fourier transform unit of FIG. 5A is removed, and a zero side-lobe unit 32a plays the role thereof. In other words, the zero side-lobe unit 32a carries out the fast Fourier transform Q of the expression (8) on a coefficient vector $\vec{H}_{dz}$ in a real space to convert the same into a coefficient vector $Q\vec{H}_{dz}$ in a frequency space. Namely, instead of calculating the expression (32), the zero side-lobe unit 32a multiplies each side of the expression (32) by an FFT operation matrix Q from the left side thereof:

$$Q\vec{H}_{dz}^T = BQ\vec{y}_{mz}^T \quad (53)$$
$$= BQX_{mz}\vec{H}_z^T \quad (\because Ex. (18))$$
$$= Qu\vec{H}_z^T$$

to directly calculate and output $Q\vec{H}_{dz}$. Thus, the zero side-lobe unit 32a provides a correlation filter 40a with the fast-Fourier-transformed coefficient data $Q\vec{H}_{dz}$ along a frequency axis instead of the time-series coefficient data $\vec{H}_{dz}$. The following processes are the same as those of the example 1.

Example 3

Another example according to the second embodiment employs a filter coefficient unit that carries out the below-mentioned process to provide a correlation filter 40 with a filter coefficient vector $\vec{H}_{dz}$. This process will be explained.

A series vector of an input signal to the correlation filter 40 is given by $$A = [a_1 a_2 \ldots a_N]. \quad (54)$$

An input signal state matrix is defined by $$X_z = \begin{bmatrix} a_1 & & & \overset{N_f-N}{O} & a_N & \cdots & \cdots & a_2 \\ a_2 & a_1 & & & & \ddots & & \vdots \\ \vdots & a_2 & \ddots & & & & \ddots & \vdots \\ a_{N-1} & \vdots & \cdots & a_1 & O & & & a_N \\ a_N & a_{N-1} & \cdots & a_2 & a_1 & & & \\ & a_N & & & & a_1 & & O \\ O & & \ddots & \vdots & & & \ddots & \\ & & O & a_N & \cdots & a_2 & a_1 \end{bmatrix}. \quad (55)$$

An output vector (expected output) with side-lobe regions suppressed to zeroes is expressed by $$y_{mz} = [0 \ldots 0 y_{N-Nx} \ldots y_N \ldots y_{N+Nx} 0 \ldots 0] = H_{dz} X_z^t. \quad (56)$$

An input signal state matrix $X_{mz}$ having $N_f \times N_f$ matrix elements can be considered as follows:

$$X_{mz} = \begin{bmatrix} X_m & \overset{N_f-N}{O} \\ O & O \end{bmatrix} \Big\} N_f - (2N-1), \quad (57)$$

here, $$X_m = \begin{bmatrix} & & O & & O & \\ a_{N-Nx} & \cdots & & \cdots & a_1 & \\ \vdots & & & & & \ddots \\ a_N & \cdots & & \cdots & & a_1 \\ & \ddots & & & & \vdots \\ & & a_N & \cdots & & a_{Nx+1} \\ O & & & O & & \end{bmatrix} \Big\} 2N-1. \quad (58)$$

If a condition for a coefficient vector $H_z$ is required as expressed by $$y_{mz} = H_{dz} X_z^t = H_z X_{mz}^t, \quad (59)$$

a coefficient vector $H_{dz}$ giving the same output signal vector $y_{mz}$ should exists. Thus, the coefficient vector $H_{dz}$ can be obtained by $$H_{dz} = H_z X_{mz}^t (X_z^t)^{-1}. \quad (60)$$

The input signal state matrix $X_{mz}$ is defined as a generalized matrix. With a unit matrix E, matrices $P_i$ each being a square matrix of $N_f \times N_f$ elements of zeros except an i-th diagonal element can be defined by $$P_i = \begin{bmatrix} & & & 0 & & & & \\ & O & & \vdots & & O & & \\ & & & 0 & & & & \\ 0 & \cdots & \cdots & 0 & 1 & 0 & \cdots & \cdots & 0 \\ & & & 0 & & & & \\ & O & & \vdots & & O & & \\ & & & 0 & & & & \end{bmatrix} \text{i-th row}, \quad (61)$$

$$\text{i-th column}$$

and $$E = \sum_{i=1}^{N_f} P_i. \quad (62)$$

For an optional square matrix Q, the following expressions are established:

$$P_i Q = \begin{bmatrix} O \\ q_{i1} & q_{i2} & \cdots & \cdots & q_{iN_f} \\ O \end{bmatrix} i\text{-th row} \quad (63)$$

and $$i\text{-th column} \quad (64)$$

$$QP_i = \begin{bmatrix} & & q_{1i} & & \\ & & q_{2i} & & \\ O & & \vdots & & O \\ & & \vdots & & \\ & & q_{Nfi} & & \end{bmatrix}$$

Thus, $P_i$ is an operator that provides a corresponding row when multiplied from the left side and provides a corresponding column when multiplied from the right side.

With the use of the above-defined operator, the input signal state matrix $X_{mz}$ can be expressed with operational matrices that pick up partial rows and columns of the initial input state matrix $X_z$ as follows:

$$X_{mz} = P_L X_Z P_R, \quad (65)$$

$$P_L = \sum_{i=N-N_x}^{N+N_x} P_i,$$

$$P_R = \sum_{j=1}^{N} P_j.$$

As results, the expected output signal vector $y_{mz}$ is expressed by $$y_{mz}{}^t = X_{mz} H_z{}^t = P_L X_Z P_R H_z{}^t. \quad (66)$$

Thus, if a coefficient vector $H_z$ giving an expected output $y_{mz}$ for an input signal state matrix $X_{mz}$ exists, a required coefficient vector $H_{dz}$ can be obtained by $$H_{dz}^t = X_z^{-1} X_{mz} H_z^t \quad (67)$$

$$= X_z^{-1} P_L X_z P_R H_z^t.$$

Accordingly, a required optimum filter $H_{dz}$ is expressed as follows:

$$H_{dz} = H_z u^t \quad (68)$$

$$= \alpha^* C_z u^* (u^t u^*)^{-1} u^t,$$

where, $$C = [C_1 \ C_2 \ \ldots \ C_N] = \lfloor a_N^* \ a_{N-1}^* \ \ldots \ a_1^* \rfloor \quad (70)$$

$$C_Z = [C \ 0 \ \ldots \ 0],$$

and $$u = X_z^{-1} P_L X_z P_R. \quad (71)$$

Following expression is a conventional derivation process:

$$u = \hat{Q} B Q X_{mz} \quad (72)$$

$$= \hat{Q}(QX_z\hat{Q})^{-1} Q X_{mz} \quad (\because B = (QX_z\hat{Q})^{-1})$$

$$= \hat{Q}(QX_z\hat{Q})^{-1} Q P_L X_z P_R$$

$$= \hat{Q}(QX_z\hat{Q})^{-1} (QP_L X_z P_R \hat{Q}) Q.$$

Using the nature of an inverse matrix, the following is obtained:

$$u = \hat{Q}(QX_z\hat{Q})^{-1}(QP_L X_z P_R \hat{Q})Q \quad (73)$$

$$= \hat{Q}(\hat{Q})^{-1} X_z^{-1} Q^{-1} Q P_L X_z P_R \hat{Q} Q$$

$$= X_z^{-1} P_L X_z P_R.$$

Therefore, the result is mathematically equivalent to that of the present invention.

Another example according to the third embodiment may carry out the fast Fourier transform Q of the expression (8) on a coefficient vector $\vec{H}_{dz}$ in a real space, to convert the same into a coefficient vector $Q\vec{H}_{dz}$ in a frequency space.

Thereafter, the coefficient vector $Q\vec{H}_{dz}$ in a frequency space may be transferred to a correlation filter.

Effect of the Invention

The correlation processor for a receiver provided by the present invention calculates a coefficient vector so that the coefficient vector may zero sample values of all sample points of an amplitude/phase-modulated received signal when the signal is correlated, except a sample value at a peak center of a main lobe of the signal and sample values on each side of the peak center and so that the coefficient vector may minimize S/N loss of the sample value of the peak center. According to the calculated coefficient vector, the correlation processor carries out a correlation operation with an FIR filter on the received signal. The correlation processor can remarkably suppress side lobes, improve resolution, and minimize S/N loss in the correlation reception process.

The correlation processor can carry out the above-mentioned process in a frequency space through Fourier transform to process a long time-series signal. The correlation processor, therefore, is appropriate for a radar.

The present invention is applicable on the condition that an input signal vector is definable even if pulse-to-pulse intervals vary due to, for example, PRF staggering, or sampling intervals are not equal. Namely, the present invention is executable if a signal on which a correlation process is carried out can be formulated. Accordingly, the present invention is applicable not only to radar signal processing but also to application that extracts a specific data pattern from a sampled data series.

The present invention provides an apparatus for realizing definite computation formulas that can suppress side lobes and theoretically minimize S/N loss, and therefore, the present invention is not restricted by conditions of input/output signals such as transmission signals.

INDUSTRIAL APPLICABILITY

The present invention is applicable to radar signal processors used for radars.

This application claims benefit of priority under 35USC §119 to Japanese Patent Applications No. 2005-192912 filed on Jun. 30, 2005 and No. 2005-302331 filed on Oct. 17, 2005, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A correlation processor provided for a receiver that receives a signal having a predetermined center frequency and a specific wave form with a finite time duration, for carrying out a correlation process on the received signal, comprising:

a filter coefficient unit configured to calculate a coefficient vector that zeroes sample values of all sample points except a peak center sample point of a main lobe of a correlation-processed waveform of the received signal and sample points on each side of the peak center and minimizes S/N loss of the sample value of the peak center sample point of the main lobe; and a filter configured to carry out a correlation process on the received signal according to the coefficient vector calculated by the filter coefficient unit, wherein the filter coefficient unit provides a coefficient vector $\vec{H}_{dz}$ given by $\vec{H}_{dz}{}^T = u\vec{H}_z{}^T$ for a vector $\vec{A} = (a_1, a_2, \ldots, a_N)$ having N elements $a_1, a_2, \ldots, a_N$ that are I/Q values sequentially sampled from the received signal, where, $$\vec{H}_z = \alpha^* \vec{C}_z u^* z^{-1},$$

$$\vec{C}_z = (\vec{C}, \overbrace{0, \ldots, 0}^{N_f - N}),$$

$$\vec{C} = (a_N^*, a_{N-1}^*, \ldots, a_1^*),$$

$$u = X_z^{-1} P_L X_z P_R,$$

$$z = u^T u^*$$

$$X_z = \begin{bmatrix} a_1 & \overbrace{O}^{N_f - N} & a_N & \cdots & \cdots & a_2 \\ a_2 & a_1 & & & & \vdots \\ \vdots & a_2 & \ddots & & & \vdots \\ a_{N-1} & \vdots & \cdots & a_1 & O & a_N \\ a_N & a_{N-1} & \cdots & a_2 & a_1 & \\ & a_N & & & a_1 & O \\ O & & \ddots & \vdots & & \ddots \\ & & O & a_N & \cdots & a_2 & a_1 \end{bmatrix},$$

$$P_L = \sum_{i=N-N_x}^{N+N_x} P_i,$$

$$P_R = \sum_{j=1}^{N} P_j,$$

and $i$-th column $$P_i = \begin{bmatrix} & & & 0 & & & \\ O & & & \vdots & & O & \\ & & & 0 & & & \\ 0 & \cdots & \cdots & 0 & 1 & 0 & \cdots & \cdots & 0 \\ & & & 0 & & & \\ O & & & \vdots & & O & \\ & & & 0 & & & \end{bmatrix} i\text{-th row},$$

here, $N_x$ is a number of non-zero output points in the vicinity of a peak, $N_f$ is the number of points in each column and row of every matrix, T is a transposed matrix, asterisk "*" is a complex conjugate, and α is an optional complex constant.

2. A correlation processor provided for a receiver that receives a signal having a predetermined center frequency and a specific waveform with a finite time duration, for carrying out a correlation process on the received signal, comprising:

a filter coefficient unit configured to calculate a coefficient vector that zeroes sample values of all sample points except a peak center sample point of a main lobe of a correlation-processed waveform of the received signal and sample points on each side of the peak center and minimizes S/N loss of the sample value of the peak center sample point of the main lobe; and a filter configured to carry out a correlation process on the received signal according to the coefficient vector calculated by the filter coefficient unit, wherein the filter coefficient unit comprises a first Fourier transform unit to carry out a Fourier transform on the coefficient vector; and the filter comprises:

a second Fourier transform unit configured to carry out a Fourier transform on the received signal;

an indirect operation unit configured to indirectly carry out a correlation process on the received signal by processing, in a frequency space, the Fourier-transformed coefficient vector from the first Fourier transform unit and the Fourier-transformed received signal from the second Fourier transform unit; and an inverse Fourier transform unit configured to carry out an inverse Fourier transform on the correlation-processed received signal from the indirect operation unit, wherein the filter coefficient unit provides a coefficient vector $\vec{H}_{dz}$ given by $\vec{H}_{dz}{}^T = u\vec{H}_z{}^T$ for a vector $\vec{A} = (a_1, a_2, \ldots, a_N)$ having N elements $a_1, a_2, \ldots, a_N$ that are I/Q values sequentially sampled from the received signal, where $$\vec{H}_z = \alpha^* \vec{C}_z u^* z^{-1},$$

$$\vec{C}_z = (\vec{C}, \overbrace{0, \ldots, 0}^{N_f - N}),$$

$$\vec{C} = (a_N^*, a_{N-1}^*, \ldots, a_1^*),$$

$$u = X_z^{-1} P_L X_z P_R,$$

$$z = u^T u^*$$

-continued $$X_z = \begin{bmatrix} a_1 & \overbrace{O}^{N_f-N} & a_N & \cdots & \cdots & a_2 \\ a_2 & a_1 & & & & \ddots & \vdots \\ \vdots & a_2 & \ddots & & & & \ddots & \vdots \\ a_{N-1} & \vdots & \cdots & a_1 & O & & a_N \\ a_N & a_{N-1} & \cdots & a_2 & a_1 & & \\ & a_N & & & a_1 & O \\ O & & \ddots & \vdots & & \ddots & \\ & & O & a_N & \cdots & a_2 & a_1 \end{bmatrix},$$

$$P_L = \sum_{i=N-N_x}^{N+N_x} P_i,$$

$$P_R = \sum_{j=1}^{N} P_j,$$

and $$P_i = \begin{bmatrix} & & & 0 & & & \\ O & & & \vdots & & O & \\ & & & 0 & & & \\ 0 & \cdots & \cdots & 0 & 1 & 0 & \cdots & \cdots & 0 \\ & & & 0 & & & \\ & & & \vdots & & & \\ O & & & \vdots & & O & \\ & & & 0 & & & \end{bmatrix} \text{ $i$-th row,}$$

$i$-th column here, $N_x$ is a number of non-zero output points in the vicinity of a peak, $N_f$ is the number of points in each column and row of every matrix, T is a transposed matrix, asterisk "*" is a complex conjugate, and $\alpha$ is an optional complex constant.

3. A correlation processor provided for a receiver that receives a signal having a predetermined center frequency and a specific wave form with a finite time duration, for carrying out a correlation process on the received signal, comprising:

a filter coefficient unit configured to calculate a coefficient vector that zeroes sample values of all sample points except a peak center sample point of a main lobe of a correlation-processed waveform of the received signal and sample points on each side of the peak center and minimizes S/N loss of the sample value of the peak center sample point of the main lobe; and a filter configured to carry out a correlation process on the received signal according to the coefficient vector calculated by the filter coefficient unit, wherein the filter coefficient unit carries out a Fourier transform on the coefficient vector and provides the Fourier-transformed coefficient vector; and the filter comprises:

a Fourier transform unit configured to carry out a Fourier transform on the received signal;

an indirect operation unit configured to indirectly carry out a correlation process on the received signal by processing, in a frequency space, the Fourier-transformed coefficient vector from the filter coefficient unit and the Fourier-transformed received signal from the Fourier transform unit; and an inverse Fourier transform unit configured to carry out an inverse Fourier transform on the correlation-processed received signal from the indirect operation unit, and wherein the filter coefficient unit provides a Fourier-transformed coefficient vector $Q\vec{H}_{dz}$ given by $Q\vec{H}_{dz}^{Ta} = Qu\vec{H}_z^T$ for a vector $\vec{A} = (a_1, a_2, \ldots, a_N)$ having N elements $a_1, a_2, \ldots, a_N$ that are I/Q values sequentially sampled from the received signal, where:

$$\vec{H}_z = \alpha^* \vec{C}_z u^* z^{-1},$$

$$\vec{C}_z = (\vec{C}, \overbrace{0, \ldots, 0}^{N_f-N}),$$

$$\vec{C} = (a_N^*, a_{N-1}^*, \ldots, a_1^*),$$

$$u = X_z^{-1} P_L X_z P_R,$$

$$z = u^T u^*$$

$$X_z = \begin{bmatrix} a_1 & \overbrace{O}^{N_f-N} & a_N & \cdots & \cdots & a_2 \\ a_2 & a_1 & & & & \ddots & \vdots \\ \vdots & a_2 & \ddots & & & & \ddots & \vdots \\ a_{N-1} & \vdots & \cdots & a_1 & O & & a_N \\ a_N & a_{N-1} & \cdots & a_2 & a_1 & & \\ & a_N & & & a_1 & O \\ O & & \ddots & \vdots & & \ddots & \\ & & O & a_N & \cdots & a_2 & a_1 \end{bmatrix},$$

$$P_L = \sum_{i=N-N_x}^{N+N_x} P_i,$$

$$P_R = \sum_{j=1}^{N} P_j,$$

and $$P_i = \begin{bmatrix} & & & 0 & & & \\ O & & & \vdots & & O & \\ & & & 0 & & & \\ 0 & \cdots & \cdots & 0 & 1 & 0 & \cdots & \cdots & 0 \\ & & & 0 & & & \\ & & & \vdots & & & \\ O & & & \vdots & & O & \\ & & & 0 & & & \end{bmatrix} \text{ $i$-th row,}$$

$i$-th column here, Q is a fast Fourier transform matrix, $N_x$ is a number of non-zero output points in the vicinity of a peak, $N_f$ is the number of points in each column and row of every matrix, T is a transposed matrix, asterisk "*" is a complex conjugate, and $\alpha$ is an optional complex constant.

* * * * *